United States Patent
Purvis et al.

(10) Patent No.: US 9,027,083 B2
(45) Date of Patent: May 5, 2015

(54) MANAGEMENT OF ACCESS IDENTIFIERS

(75) Inventors: Chris Purvis, Waxhaw, NC (US); Dipika Jain, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 503 days.

(21) Appl. No.: 13/198,890

(22) Filed: Aug. 5, 2011

(65) Prior Publication Data
US 2013/0036454 A1    Feb. 7, 2013

(51) Int. Cl.
H04L 9/32       (2006.01)
G06Q 20/32      (2012.01)
G06F 21/62      (2013.01)
G06F 21/31      (2013.01)

(52) U.S. Cl.
CPC ........ G06Q 20/3223 (2013.01); G06Q 20/3224 (2013.01); G06F 21/31 (2013.01); G06F 21/6218 (2013.01)

(58) Field of Classification Search
CPC . G06F 21/31; G06F 21/6218; G06Q 20/3224; G06Q 30/3223
See application file for complete search history.

(56) References Cited

U.S. PATENT DOCUMENTS

| | | | |
|---|---|---|---|
| 6,981,043 B2 * | 12/2005 | Botz et al. | 709/225 |
| 7,155,614 B2 * | 12/2006 | Ellmore | 713/183 |
| 7,177,830 B2 * | 2/2007 | Shields et al. | 705/35 |
| 7,774,620 B1 * | 8/2010 | Stott et al. | 713/193 |
| 7,873,571 B1 * | 1/2011 | Wehmer | 705/39 |
| 2002/0078386 A1 * | 6/2002 | Bones et al. | 713/202 |
| 2005/0262132 A1 * | 11/2005 | Morita et al. | 707/102 |
| 2008/0159318 A1 * | 7/2008 | Pierlot et al. | 370/412 |
| 2008/0226142 A1 * | 9/2008 | Pennella et al. | 382/124 |
| 2009/0019534 A1 * | 1/2009 | Bakshi et al. | 726/6 |
| 2009/0133110 A1 * | 5/2009 | Kumar et al. | 726/8 |
| 2009/0187492 A1 * | 7/2009 | Hammad et al. | 705/26 |
| 2010/0114750 A1 * | 5/2010 | Xu | 705/35 |
| 2011/0161369 A1 * | 6/2011 | Fiducci | 707/783 |
| 2011/0283350 A1 * | 11/2011 | Brandt et al. | 726/13 |
| 2012/0324589 A1 * | 12/2012 | Nukala et al. | 726/28 |

OTHER PUBLICATIONS

Geist "Get Used to Geo-Blocking Online", Jul. 10, 2010, pp. 1-4, TheTyee.ca, retrieved from Internet Archive Wayback Machine (http://thetyee.ca/Mediacheck/2010/07/06/GetUsedToGeoBlocking/).*

(Continued)

*Primary Examiner* — Jung Kim
*Assistant Examiner* — James J Wilcox
(74) *Attorney, Agent, or Firm* — Michael A. Springs

(57) ABSTRACT

Access to an on-line account management system is facilitated. A request is received to perform a first action using an on-line account management system. The request comprises a first access identifier. A global party identifier associated with the first access identifier is determined. Restriction information associated with the first access identifier and the global party identifier is accessed from a global party profile operable to store at least one of a time-based, a location-based, and a device-based restriction associated with actions capable of being performed using the on-line account management system. A processor determines whether the first action is permissible based on the restriction information associated with the first access identifier and the global party identifier.

12 Claims, 3 Drawing Sheets

(56) References Cited

OTHER PUBLICATIONS

Dickinson, "Exceeding Transaction Limits Online," Answer by David Dickinson and John Burnet, BOL Gurus, BankersOnline.com Compliance Gurus, Dec. 4, 2010, pp. 1-2, retrieved from Internet Wayback Machine (http://www.bankersonline.com/compliance/guru2010/gurus_comp101810e. html).*

* cited by examiner

MANAGEMENT OF ACCESS IDENTIFIERS

TECHNICAL FIELD OF THE INVENTION

This invention relates generally to access management and, more specifically, to the management of access identifiers.

BACKGROUND

A user may have one or more accounts offered from an enterprise. In particular, a user may have various financial services and products from an enterprise. The enterprise may allow the user to perform various actions associated with the financial services and products. To initiate the various actions, the user generally uses the same access credentials.

SUMMARY OF THE DISCLOSURE

In accordance with the present invention, disadvantages and problems associated with managing access identifiers for use with an on-line interface may be reduced or eliminated.

According to one embodiment of the present invention, access to an on-line account management system is facilitated. A request is received to perform a first action using an on-line account management system. The request comprises a first access identifier. A global party identifier associated with the first access identifier is determined. Restriction information associated with the first access identifier and the global party identifier is accessed from a global party profile operable to store at least one of a time-based, a location-based, and a device-based restriction associated with actions capable of being performed using the on-line account management system. A processor determines whether the first action is permissible based on the restriction information associated with the first access identifier and the global party identifier.

Certain embodiments of the invention may provide one or more technical advantages. A technical advantage of one embodiment allows a user to create multiple identifiers with associated privileges for on-line access to accounts. For example, a user may designate an identifier with per-session, time-based restriction for use on computers accessed on-the-go while traveling on vacation in another country. As another example, a user traveling in remote locales with no suitable computers may designate an identifier for use for a friend at home with a device-based restriction that specifies that access is only permissible from the friend's home computer. Another technical advantage of an embodiment allows the user to designate identifiers with read-only account access for use with third-party on-line account aggregators. This way, a user may utilize the features of the on-line account aggregator with reduced account exposure should the read-only access identifier fall into the hands of a dubious third-party. Another technical advantage of an embodiment allows for designating an access identifier for use with a single account. This access identifier could be linked to a child's savings account to help teach financial responsibility and account ownership.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
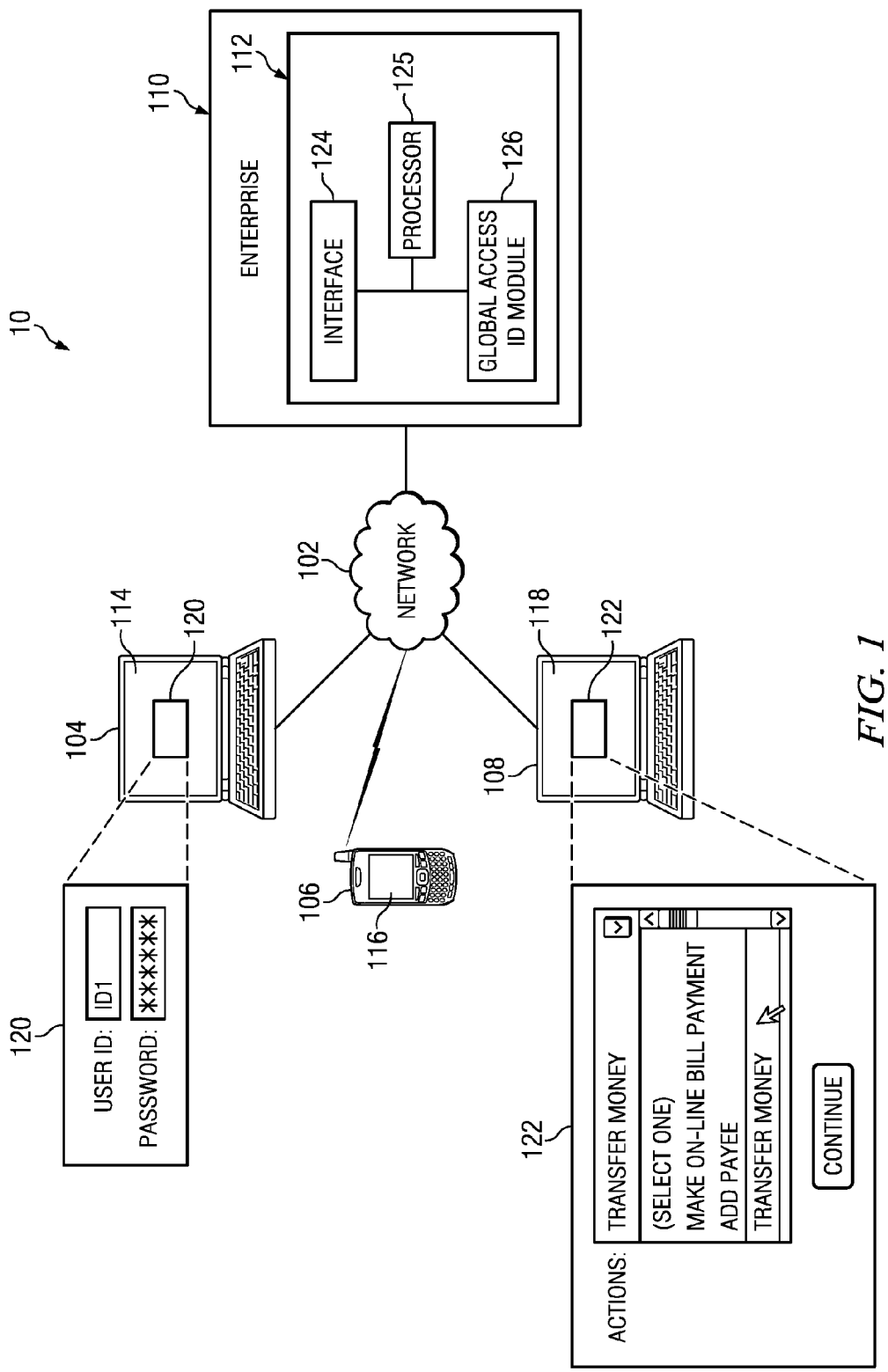
FIG. 1 illustrates an exemplary system that facilitates access to an on-line account management system.
Figure 2:
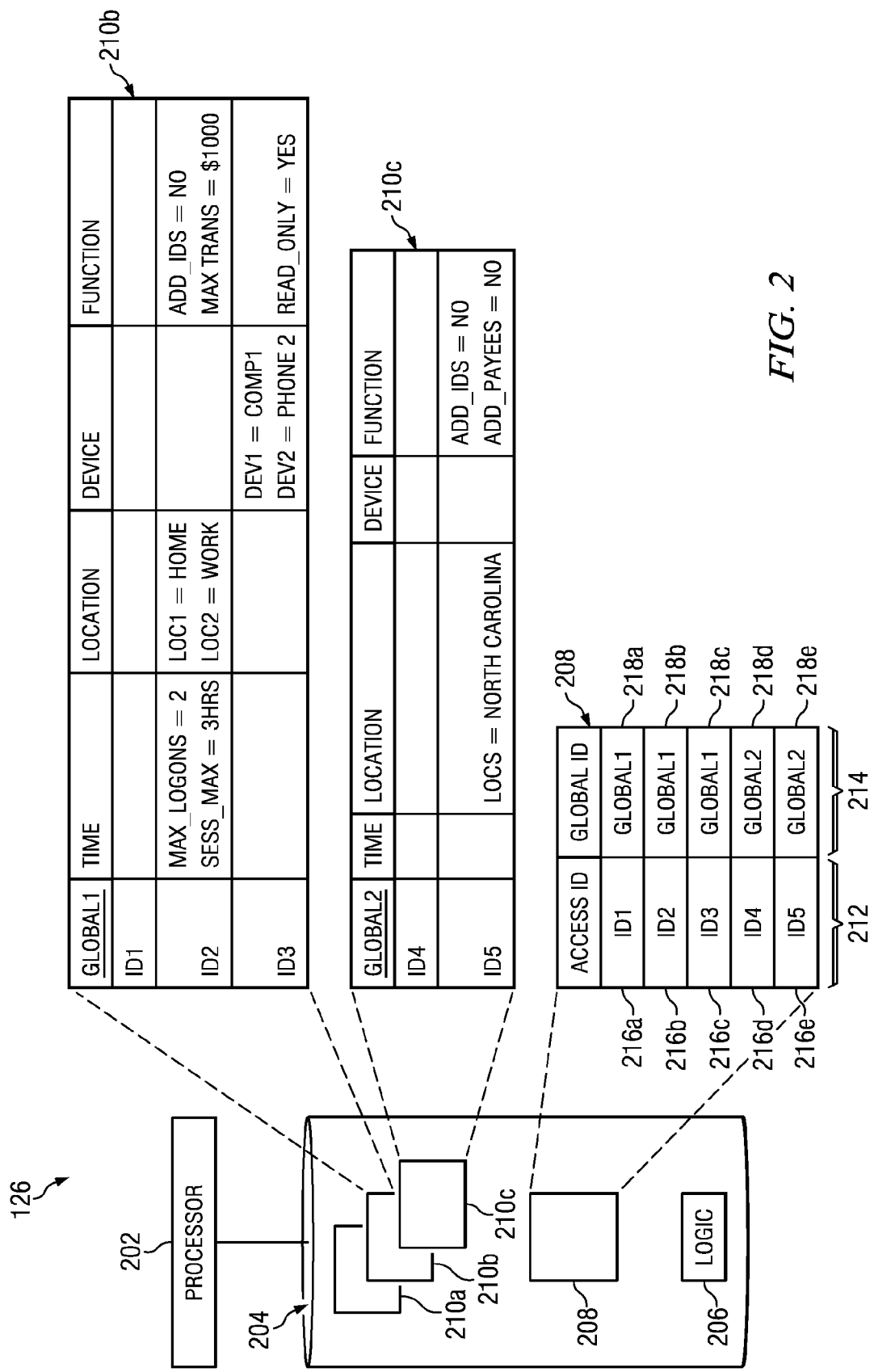
FIG. 2 illustrates an exemplary embodiment of a global access ID module that stored restriction information associated with access identifiers.
Figure 3:
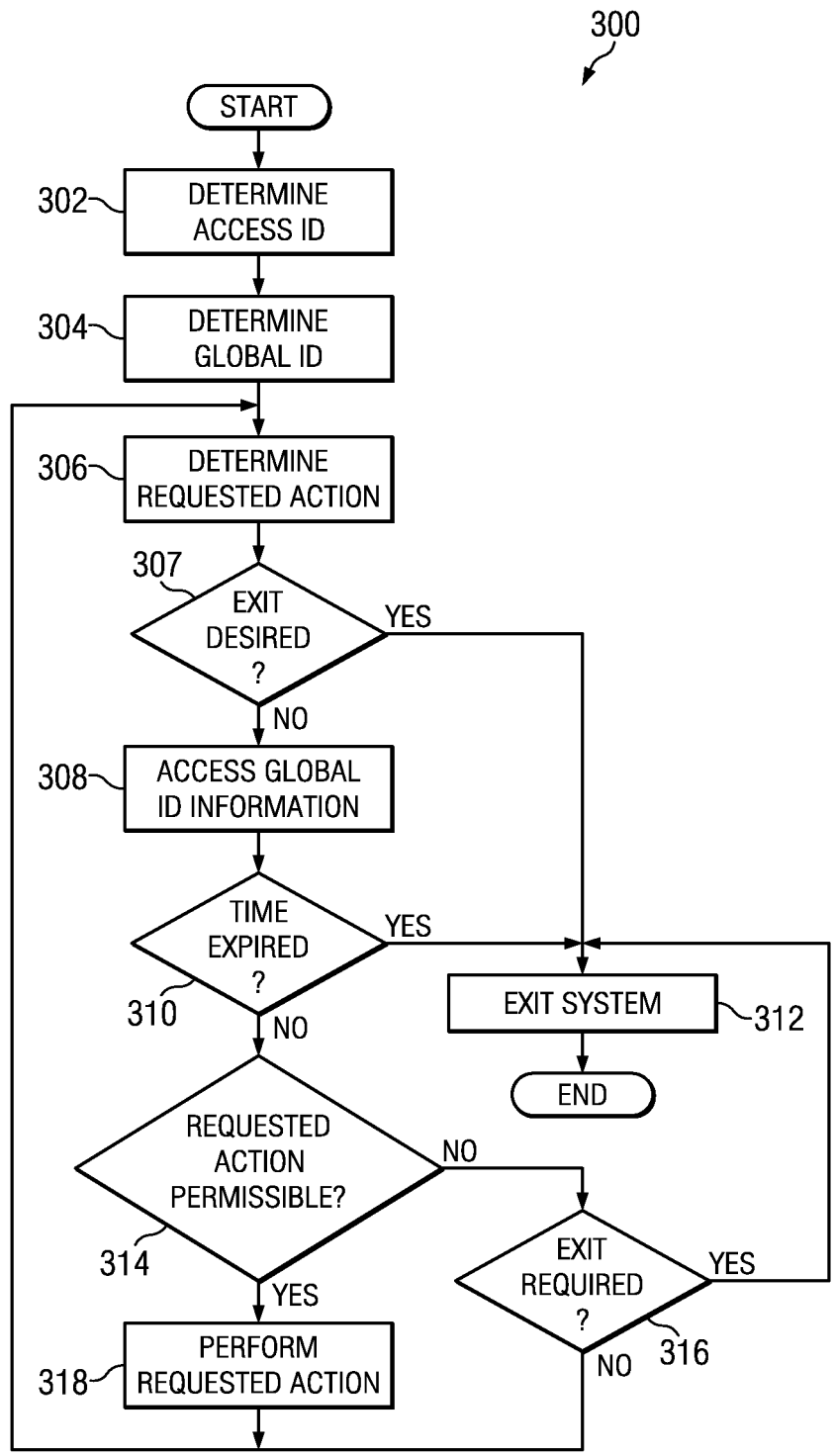
FIG. 3 illustrates an exemplary flow chart for processing a request to perform an action.

Embodiments of the present invention and its advantages are best understood by referring to FIGS. 1 through 3, like numerals being used for like and corresponding parts of the various drawings.

FIG. 1 illustrates a system 10 that facilitates access to an on-line account management system 112 of an enterprise 110. System 10 includes various access devices such as computer 104, wireless phone 106, and computer 108 that communicate with on-line account management system 112 over one or more networks 102. Access devices 104, 106, and 108 may attempt to access on-line account management system 112 to perform various actions associated with one or more user accounts.

Users of system 10 may have several access identifiers associated with one or more on-line accounts accessible through on-line account management system 112. The various access identifiers may be associated with restriction information that specifies identifier-associated restrictions on actions capable of being performed using on-line account management system 112. For example, a user may have a first access identifier that is not associated with any restrictions. System 10 may allow a user using the first access identifier to perform any action capable of being performed with on-line account management system 112 without restraint. In certain embodiments, a first access identifier or any other access identifier may be associated with restriction information that specifies that a location-based, device-based, time-based, functionality-based or any other suitable restriction exists that prohibits certain actions from being performed by on-line account management system 112 using the first or other access identifier. The restriction information may include any one, multiple, or any suitable combination of the various types of restrictions. On-line accounts may be associated with multiple access identifiers with each access identifier being associated with a particular set of restrictions, where the particular set may be the same or different across multiple access identifiers.

System 10 may include any number of suitable access devices that facilitate access to on-line account management system 110 such as computers (including, without limitation, personal computers, tablet computers, and laptops), wireless or cellular telephones, personal digital assistants, other handheld devices, or any other device suitable for communicating in system 10. Certain embodiments of system 10 include computer 104, wireless phone 106, and/or computer 108 as access devices. Each access device may be associated with certain identifying information such as an Internet Protocol ("IP") address, which may be communicated to enterprise 110 using any suitable protocol. In certain embodiments, each access device may be associated with a device profile that indicates identifying information such as device name, location, platform, operating system, and/or any other suitable information.

In certain embodiments, computer 114, wireless phone 106, and computer 108 include graphical user interfaces ("GUIs") 114, 116, and 118, respectively, which display information received from on-line account management systems 112 to a user. GUIs 114, 116, and 118 are generally operable to tailor and filter data entered by and presented to the user. GUIs 114, 116, and 118 may provide the user with an efficient and user-friendly presentation of information. For example, GUIs 114, 116, and 118 may display information regarding a checking account, a savings account, a brokerage account, a loan account, an investment account, or any other suitable account. GUIs 114, 116, and 118 may comprise a plurality of displays having interactive fields, pull-down lists, and buttons operated by the user. GUIs 114, 116, and 118 may include multiple levels of abstraction including groupings and boundaries. It should be understood that the term GUI may be used in the singular or in the plural to describe one or more GUIs and each of the displays of a particular GUI 114, 116, and/or 118.

GUIs 114, 116, and 118 may be displayed to a user using a web browser that allows a user of access devices 104, 106, and 108 to interact with a website, hosted by enterprise 110 for example, by transmitting information to and receiving information from the website. Suitable web browsers may include Microsoft Internet Explorer®, Mozilla Firefox®, Google Chrome™, Apple Safari™, or Opera®. In certain embodiments, GUIs 114, 116, and 118 may be displayed using an application natively installed on each of access devices 104, 106, and 108. For example, enterprise 110 may create and distribute a banking application designed for computers 104 and 108 and another banking application designed for wireless phone 106 that both operate outside of a web browser. A user may install the banking application on an access device and interact with the GUI provided by the banking application to communicate with and instruct on-line account management system 112 to perform certain actions. In certain embodiments, GUIs 114, 116, and 118 may be provided by a website or native application maintained by a third-party, such as an on-line account aggregator.

Using suitable access credentials, users of access devices may access any suitable account information, such as checking account information, savings account information, education savings information, credit card information, bill payment information, loan information, brokerage account information, investment account information, or any combination of the preceding. As one example, suitable access credentials may include an access identifier (or User ID) and password combination associated with appropriate privileges as specified by applicable restriction information. For example, in the illustrated embodiment, a user of computer 104 has entered an access identifier "ID1" into a GUI control 120 of GUI 114 in an attempt to log on (or gain entry) to on-line account management system 112. On-line account management system 112 may access restriction information associated with access identifier ID1 and any other suitable information (such as the correct password associated with access identifier ID1) to determine whether to allow the user to successfully access the system. If restriction information indicates that a user attempting to log on to the system is not allowed to do so, a message may be displayed to the user indicating such. A user may create an access identifier using, for example, on-line account management system 112 or enterprise 110 may assign the access identifier to the user.

As another example of interaction, GUIs 114, 116, and 118 may allow a user to attempt to access on-line account management system 112 to perform certain actions associated with any suitable account such as the accounts named above. For example, a user may attempt an action associated with a checking account such as paying a bill on-line to a payee.

More specifically, a GUI control, such as GUI control 122 of GUI 118, may provide several actions capable of being performed using on-line account management system 112. In the illustrated embodiment, a user of computer 108 has selected an action "Transfer Money." On-line account management system 112 accesses restriction information associated with the access identifier used to log on to on-line account management system 112 to determine whether the user is allowed to perform the selected action. GUI 118 may inform the user that the user is not allowed to perform that action because of a functionality restriction associated with the access identifier used to log on to on-line account management system 112. Alternatively, GUI 118 may indicate that the user is allowed to perform that action, confirm successful completion of the action, indicate whether a problem occurred with the action unrelated to associated restriction information, or any suitable combination of the preceding.

Network 102 represents any suitable network that facilitates communication between the components of system 10, such as access devices 104, 106, and 108 as well as enterprise 110 and on-line account management system 112. Network 102 may include any interconnecting system capable of transmitting audio, video, signals, data, messages, or any combination of the preceding. Network 102 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof operable to facilitate communication between the components.

Enterprise 110 may refer to a financial institution, such as a bank, brokerage house, or investment firm that communicates with access devices 104, 106, and 108 to provide access and perform actions associated with financial accounts, products, and services. Even though enterprise 110 is referred to as a financial institution, enterprise 110 represents any suitable type of entity in any suitable industry that allows a user to attempt to access an account on-line and perform actions associated with the account. Enterprise 110 may include various components operable to carry out actions in connection with user accounts. Certain embodiments of enterprise 110 include on-line account management system 112.

On-line account management system 112 represents any suitable components operable to facilitate communication with access devices 104, 106, and 108 and allow users of those devices to attempt to perform certain actions associated with one or more accounts. On-line account management system 112 may include a network server, any suitable remote server, a mainframe, a host computer, a workstation, a web server, a personal computer, a file, server, or any other suitable device operable to communicate with access devices 104, 106, and 108 and process data. In some embodiments, on-line account management system 112 may execute any suitable operating system such as IBM's zSeries/Operating system (z/OS), MS-DOS, PC-DOS, MAC-OS, WINDOWS, UNIX, OPenVMS, Linux, or any other appropriate operating systems, including operating systems developed in the future. The functions of on-line account management system 112 may be performed by any suitable combination of one or more servers or other components at one or more locations. In the embodiment where the modules are servers, the servers may be public or private servers, and each server may be a virtual or physical server. The server may include one or more servers at the same or at locations remote from one another.

Also, on-line account management system 112 may include any suitable component that functions as a server.

In certain embodiments, on-line account management system 112 includes a network interface 124, a processor 125, and a global access ID module 126.

Network interface 124 represents any suitable device operable to receive information from network 102, perform suitable processing of the information, communicate to other devices, or any combination of the preceding. For example, network interface 124 may receive a request to log on to on-line account management system 112 from a user of computer 104 using access identifier ID1. As another example, network interface 124 may receive a request to Transfer Money from a user of computer 108 and direct the request to the appropriate module of on-line account management system 112. Network interface 124 represents any port or connection, real or virtual, including any suitable hardware and/or software, including protocol conversion and data processing capabilities, to communicate through a LAN, WAN, or other communication systems that allows on-line account management system 112 to exchange information with network 102, computer 104, wireless phone 106, computer 108 or other components of system 10.

Processor 125 communicatively couples to network interface 124 and global access ID module 126. Processor 125 controls the operation and administration of on-line account management system 112 by processing information received from network interface 124 and global access ID module 126. Processor 125 includes any hardware and/or software that operates to control and process information. For example, upon receiving a request to perform a certain action from a user by way of interface 124, processor 125 instructs global access ID module 126 to determine whether there is restriction information associated with the access identifier included in the request. Processor 125 may be a programmable logic device, a microcontroller, a microprocessor, any suitable processing device, or any suitable combination of the preceding.

Global access ID module 126 represents any suitable components that facilitate accessing restriction information associated with an access identifier. Global access ID module 126 may include a network server, any suitable remote server, a mainframe, a host computer, a workstation, a web server, a personal computer, a file, server, or any other suitable device operable to determine whether restriction information is associated with an access identifier. In some embodiments, global access ID module 126 may execute any suitable operating system such as IBM's zSeries/Operating system (z/OS), MS-DOS, PC-DOS, MAC-OS, WINDOWS, UNIX, OPenVMS, Linux, or any other appropriate operating systems, including operating systems developed in the future. The functions of global access ID module 126 may be performed by any suitable combination of one or more servers or other components at one or more locations. In the embodiment where the modules are servers, the servers may be public or private servers, and each server may be a virtual or physical server. The server may include one or more servers at the same or at locations remote from one another. Also, global access ID module 126 may include any suitable component that functions as a server. An exemplary embodiment of global access ID module 126 is discussed below with respect to FIG. 2.

In an exemplary embodiment of operation of system 10, a user utilizes wireless phone 106 to access a website associated with enterprise 110 using GUI 116. The user enters access credentials comprising an access identifier and password on GUI 116, which are transmitted to enterprise 110 and on-line account management system 112 over network 102. The request to access on-line account management system 112 also comprises an IP address associated with wireless phone 116.

On-line account management system 112 receives the request through interface 124. Network interface 124 alerts processor 125 to an attempted access of on-line account management system 112. Processor 125 directs interface 124 to pass the request to the appropriate modules of on-line account management system 112, including global access ID module 126. Global access ID module 126 determines whether there is restriction information associated with the access identifier included in the request for access. In this example, global access ID module 126 determines that there is a device restriction that specifies that only devices with certain IP addresses may access on-line account management system 112 using the access identifier provided in the request. Global access ID module 126 determines that the IP address transmitted with the request is included in the list of IP addresses permitted to access on-line account management system 112 using the access identifier provided. Global access ID module 126 provides the results of its determination to processor 125.

Continuing with this example embodiment of operation, processor 125 provides the request to an authentication module (not shown), which determines whether the password provided with the request is sufficient to authenticate the user attempting to access on-line account management system 112. Upon successful password authentication, processor 125 directs the appropriate modules of enterprise 110 and on-line account management system 112 to access information associated with a checking account and a savings account associated with the provided access identifier. Processor 125 directs interface 124 to transmit instructions to wireless phone 106 that updates GUI 116 with any suitable portion of the retrieved account information and one or more actions capable of being performed using on-line account management system 112.

In another example of attempting to perform an action, the user of wireless phone 106 selects a "Transfer Funds" option on GUI 116 after successfully logging on to on-line account management system 112. The user attempts to transfer money from a savings account to a checking account. The request is sent to enterprise 110 in a similar fashion as the log on request discussed above. Processor 125 instructs global access ID module 126 to access restriction information associated with the access identifier. In this example, the restriction information indicates a functionality restriction that specifies that a user using the provided access identifier is not allowed to transfer funds between accounts. On-line account management system 112 updates GUI 116 to indicate that the attempted operation failed because of insufficient permissions.

A component of the system 10 may include an interface, logic, memory, and/or other suitable element. An interface receives input, sends output, processes the input and/or output, and/or performs other suitable operations. An interface may comprise hardware and/or software. Logic performs the operations of the component. For example, logic executes instructions to generate output from input. Logic may include hardware, software, and/or other logic. Logic may be encoded in one or more non-transitory, tangible media, such as a computer readable medium or any other suitable tangible medium, and may perform operations when executed by a computer. Certain logic, such as a processor, may manage the operation of a component. Examples of a processor include one or more computers, one or more microprocessors, one or more applications, and/or other logic.

Modifications, additions, or omissions may be made to system 10 without departing from the scope of the invention. For example, global access ID module 126 may authenticate user passwords in addition to accessing restriction information associated with access identifiers. In another example, a request to log on may include an access identifier but exclude a password. In this example, the authentication by password may not be necessary or may be performed outside of enterprise 110. As another example, a request directed to on-line account management system 112 may comprise both a request for access and a request to perform an action associated with an account. In another example, a request directed to on-line account management system 112 may include specific account access identifiers such that the information retrieved and possible actions performed by on-line account management system 112 may relate only to accounts associated with the account access identifiers provided in the request. In another example, system 10 may exclude GUIs 114, 116, and 118 such that requests to perform actions are initiated using a command line interface or other suitable interface.

In certain embodiments, global access ID module 126 may access all restriction information associated with an access identifier when a user attempts to log on to on-line account management system 112. In these embodiments, GUIs 114, 116, and 118 may automatically exclude options that the user is restricted from performing as specified by the restriction information. In certain embodiments, global access ID module 126 may only access restriction information pertinent to the specific action that the user is attempting to perform. This embodiment may have the advantage of more efficient processing given that system 10 may have to retrieve and keep track of less restriction information.

FIG. 2 illustrates an exemplary embodiment of global access ID module 126 that facilitates accessing restriction information associated with an access identifier. This exemplary embodiment comprises a processor 202 communicatively coupled to a memory 204.

Processor 202 communicatively couples to memory 204 and controls the operation and administration of global access ID module 126 by processing received information and accessing global identifier lookup structure 208 and global party profiles 210. Processor 202 includes any hardware and/or software that operates to control and process information. For example, processor 202 may execute logic 206 to control operation of global access ID module 126. Processor 202 may be a programmable logic device, a microcontroller, a microprocessor, any suitable processing device, or any suitable combination of the preceding.

Memory 204 stores, either permanently or temporarily, data, operational software, or other information for processor 202. Memory 204 includes any one or a combination of volatile or nonvolatile local or remote devices suitable for storing information. For example, memory 204 may include random access memory (RAM), read only memory (ROM), magnetic storage devices, optical storage devices, or any other suitable information storage device or a combination of these devices. While illustrated as including particular modules, memory 204 may include any suitable information for use in the operation of global access ID module 126.

Logic 206 represents any suitable set of instructions, software, or code embodied in a computer-readable storage and operable to facilitate the operation of global access ID module 126. For example, logic 206 may include rules that indicate that processor 202 should use global identifier lookup structure 208 to determine a global identifier associated with an identifier included in a request to perform an action.

Users of system 10 use access identifiers when attempting to access on-line account management system 112 and perform actions associated with one or more accounts. An account holder is a user with unrestricted control over an account. Each account holder may be associated with a global identifier, which is in turn associated with one or more access identifiers. The account holder may choose to associate each access identifier with restriction information as described more fully below.

An account holder may control multiple accounts. In this situation, the account holder may have one global identifier associated with all of their accounts or may have multiple global identifiers associated with one or more of their accounts. Likewise, each access identifier may be associated with one or more accounts, as specified by suitable restriction information.

Global identifier lookup structure 208 may store associations between access identifiers and global identifiers. In certain embodiments, global identifier lookup structure 208 may be represented by a table. The identifiers in the cells 216 of column 212 are associated with the global identifiers in the corresponding cells 218 of column 214. When a user attempts to perform certain actions using a certain access identifier, global identifier lookup structure 208 provides the associated global identifier. For example, in the illustrated embodiment, access identifier ID1 is associated with global identifier GLOBAL1. In addition to access identifier ID1, access identifiers ID2 and ID 3 are also associated with global identifier GLOBAL1. This may indicate that access identifiers ID1, ID2, and ID3 are each associated with the same account holder or the same account(s). Access identifiers ID4 and ID5 are associated with global identifier GLOBAL2. This may indicate that access identifiers ID4 and ID5 are each associated with the same account holder or the same account(s).

Global party profiles 210 may store restriction information associated with each of the access identifiers associated with a global identifier. While the illustrated embodiment depicts global party profiles 210 as tables, global party profiles 210 may be stored as any suitable data structure. In certain embodiments, global party profiles 210 store information related to prior attempts to log on or execute actions using on-line account management system 112. Alternatively, this information may be stored elsewhere in memory 204 or in any suitable component of enterprise 110.

Global party profiles 210 may store restrictions based on any suitable factors such as time, location, device type, function, or any combination of the preceding. Restriction information may be defined as prohibitions (i.e., what cannot be done), permissions (i.e., what can be done), or any suitable combination of the preceding.

A time-based restriction may comprise a maximum amount of log on time. For example, a user using an access identifier associated with this type of time-based restriction may be forced to log out of on-line account management system 112 before the passage of time allotted in the time based restriction. The maximum amount of time may be set according to any suitable scale such as minutes, hours, days, etc. The maximum time may be a per-session time limit or cumulative time limit. A per-session, time-based restriction may specify a time limit for each log on to on-line account management system 112. A cumulative time-based restriction may aggregate the time spent logged on to on-line account management system 112 using a certain identifier over one or more sessions, forcing a log out or prohibiting access only after the aggregate time spent equals or exceeds the allowable time limit. In certain embodiments, on-line account management system 112 may allow a user to exceed the time-based restriction if the user initiates an action before reaching the specified time limit. In such an embodiment, on-line account management system 112 may force a log out after the final disposition of the requested action.

A time-based restriction may also comprise a maximum number of times a user may log on to on-line account management system 112 using a particular access identifier. As this type of time-based restriction limits the number of uses or sessions for which an access identifier may log-in to on-line account management system 112, it may also be referred to as a use-based restriction. With this type of restriction, an access identifier may only be used to log-in the amount of times specified in the restriction. The restriction may specify that a particular access identifier may be used for no more than one, two, ten, or any other suitable number of log-ins to on-line account management system 112. For example, a particular access identifier with a use-based restriction of this type having a threshold of two indicates that a user cannot log on to on-line account management system 112 using the particular access identifier more than two separate times. After the second log-in, subsequent attempts to log on to on-line account management system 112 will fail.

A location-based restriction may specify the locations from which a user may log on to on-line account management system 112 using a particular identifier. A location-based restriction may specify either permissible locations or the locations from which log on is prohibited. A location restriction can also specify that a certain function cannot be performed from a certain location after log on to on-line account management system 112. The location may refer to a geographic location, a name of a place as specified by an identifier such as "Home," or any other suitable reference to a location.

A location of a user using an access device may be derived using any suitable method. For example, the location may be derived using the IP address of the access device used by the user. As another example, an access device profile or a portion of the profile containing a location may be transmitted along with the request to perform an action. As another example, a GUI on the access device may request that the user enter a location. As another example, an access device may use the Global Positioning System ("GPS") or cellular towers to determine its location and transmit the determined location with the request to perform an action. As another example, logic 206 may contain rules that allow processor 202 to determine the location of an access device based on the hops and/or path taken by a data packet comprising any suitable portion of a request to perform an action.

A device-based restriction may specify the devices from which a user may log on to on-line account management system 112 using a particular access identifier. A device-based restriction may specify either permissible access devices or the access devices from which log on is prohibited. The restriction may comprise an identifier for the access device and/or certain characteristics of the access device such as its operating system, for example. A device restriction can also specify that a certain function cannot be performed from a certain access device after log on to on-line account management system 112. The access device being used by the user may be communicated from the access device as all or a part of a device profile and/or the user may enter device characteristics into a GUI. As another example, global party profiles may store an association between a device and an IP address such that on-line account management system 112 can determine whether to allow the device to perform an action.

A functionality restriction may specify the functions that a user using a particular access identifier is entitled to perform. In certain embodiments, the functionality restriction may specify the functions that a user using a particular access identifier is prohibited from performing. The functionality restriction may be associated with any suitable function such as, for example, transferring funds between accounts held by the same account holder and/or different account holders, paying bills on-line, adding a payee to be paid amounts out of an account, initiating wire transfers, changing profile information such as address or phone number, viewing only certain portions of all available account information such as only balance information, having read-only access to account information, and adding additional access identifiers with associated restriction information pertinent to any of the preceding.

Restriction information may combine any of the types of restrictions. For example, a location-based restriction may indicate that a user using a particular access identifier cannot perform a certain function (such as initiating monetary transfers) from a location other than Home or Work. As another example, a device restriction may indicate that a user using a particular access identifier cannot perform a certain function (such as paying a bill that exceeds a certain amount) from a device other than those included on a permissible list of devices.

A user may create an access identifier specifically for use by an on-line aggregator. An on-line aggregator is an entity that provides access to a user's accounts from disparate sources, such as different enterprises. For example, an on-line aggregator may provide information from a checking account from a first enterprise and a loan account from a second enterprise. The on-line aggregator may only require read-only access to account information and only need that access for a short period of time. In this case, a user may give the on-line account aggregator an access identifier associated with restriction information that specifies read-only access. Further, the associated restriction information may specify a per-session, time-based restriction limit of five minutes. In this way, a user may ensure that unwanted account actions do not occur but still take advantage of the features of an on-line account aggregator. As another example, restriction information associated with an access identifier created for an on-line aggregator may specify that only devices with IP addresses associated with the on-line aggregator may initiate actions. With certain configurations of restriction information, a user may reduce unwanted actions initiated by a party that surreptitiously obtains access credentials from the on-line aggregator.

Global party profiles 210b and 210c illustrate example restriction information associated global identifiers and access identifiers. Global party profile 210b comprises restriction information for access identifiers associated with global identifier GLOBAL1. Global party profile 210b includes a first access identifier ID1 that does not have any restrictions specified. This, for example, may be an access identifier used by the account holder. A second access identifier ID2 includes a per-session, time-based restriction of three hours and a maximum number of uses, time-based restriction of two log-on sessions. ID2 has a location-based restriction that specifies that actions may only be initiated from HOME or WORK. ID2 has a functionality-based restriction that indicates that a user cannot add additional identifiers or initiate transactions that exceed $1000 using the second access identifier. A third access identifier ID3 has a device-based restriction that specifies that actions may only be initiated from the devices COMP1 or PHONE2. ID3 also has a functionality-based restriction that specifies that a user has read-only access using this access identifier.

Global party profile 210c comprises restriction information for access identifiers associated with global identifier GLOBAL2. Global party profile 210c includes a fourth identifier ID4 that does not have any restrictions specified. This, for example, may be an access identifier used by the account holder. A fifth access identifier ID5 has a location-based restriction that specifies that actions may only be initiated from access devices located within the state of North Carolina. ID5 has a functionality-based restriction that specifies that a user cannot add additional identifiers or additional payees.

Modifications, additions, or omissions may be made to global access ID module 126. For example, global identifier lookup structure 208 and global party profiles 210 may be combined into one data structure. As another example, global party profiles 210 could be based on specific enterprise accounts instead of or in addition to the global identifier. Any suitable logic comprising software, hardware, other logic, or any suitable combination of the preceding may perform the functions of global access ID module 126.

FIG. 3 illustrates an exemplary method 300 for performing an action associated with an account according to applicable restrictions information.

At step 302, an access identifier is received at on-line account management system 112, perhaps through an attempt to log on from an access device. At step 304, on-line account management system 112 determines a global identifier associated with the access identifier received in step 302. On-line account management system 112 may store the received access identifier and determined global identifier for use throughout a session that the user is logged on to on-line account management system 112. At step 306, the action requested by the user is determined. The requested action may be an initial log on for a session with on-line account management system 112 or any other suitable action such as transferring funds. The attempt to perform the action may also be recorded at step 306 for later use by on-line account management system 112. At step 307, on-line account management system 112 determines whether the requested action is to exit, which may be provided as an option on GUI 122, for example. If the requested action is an exit, the user exits on-line account management system 112 at step 312.

If the requested action is anything other than an exit, on-line account management system accesses restriction information associated with the global identifier and the specific access identifier at step 308. The restriction information may comprise restriction information based on time, location, device, functionality, any other suitable type of restriction, or any combination of the preceding. Step 310 determines whether a time limit specified by a per-session, time-based restriction has been exceeded. If so, the user is forced to log out at step 312 where the user may be informed of the log out through GUI 114. If not, step 314 determines whether the requested action is permissible according to the restriction information stored in global party profiles 210.

If the requested action is permissible, on-line account management system 112 permits the user to execute the requested action at step 318. On-line account management system 112 may also make a record of the successfully attempted action. The method then repeats with on-line account management system 112 determining a requested action at step 306.

Returning to step 314, if the requested action is not permissible, on-line account management system 112 may make a record of the failure of the attempted action. Step 316 determines whether an exit is required at step 316. This may happen if the user requested to log in to on-line account management system 112, and a location-based restriction prohibited access because the access device was not in a permitted location, for example. If an exit is required, the user exits on-line account management system 112 at step 312. If an exit is not required, the method repeats with on-line account management system 112 determining a requested action at step 306.

Modifications, additions, or omissions may be made to method 300 disclosed herein without departing from the scope of the invention. The methods may include more, fewer, or other steps. For example, step 302 may determine an access identifier based on other information such as a user first name, last name, and zip code. Additionally, steps may be performed in parallel or in any suitable order.

Certain embodiments of the invention may provide one or more technical advantages. A technical advantage of one embodiment allows a user to create multiple identifiers with associated privileges for on-line access to accounts. For example, a user may designate an identifier with per-session, time-based restriction for use on computers accessed on-the-go while traveling on vacation in another country. As another example, a user traveling in remote locales with no suitable computers may designate an identifier for use for a friend at home with a device-based restriction that specifies that access is only permissible from the friend's home computer. Another technical advantage of an embodiment allows the user to designate identifiers with read-only account access for use with third-party on-line account aggregators. This way, a user may utilize the features of the on-line account aggregator with reduced account exposure should the read-only access identifier fall into the hands of a dubious third-party. Another technical advantage of an embodiment allows for designating an access identifier for use with a single account. This access identifier could be linked to a child's savings account to help teach financial responsibility and account ownership.

Although the present invention has been described with several embodiments, a myriad of changes, variations, alterations, transformations, and modifications may be suggested to one skilled in the art, and it is intended that the present invention encompass such changes, variations, alterations, transformations, and modifications as falling within the scope of the appended claims.

What is claimed is:

1. An on-line account management system, comprising:
a memory comprising rules for facilitating access to an on-line account management system; and
a processor communicatively coupled to the memory and operable to:
facilitate receiving a request to perform a first action associated with a bank account using the on-line account management system, wherein the request comprises a first access identifier;
determine a global party identifier associated with the first access identifier, wherein the global party identifier is associated with a first user that is associated with the first access identifier, and the global party identifier is also associated with a second user that is associated with a second access identifier, wherein the first user and the second user are different users;
access restriction information associated with the first access identifier and the global party identifier from a global party profile operable to store each of a time-based, a location-based, a functionality-based, and a device-based restriction associated with actions capable of being performed with the bank account using the on-line account management system, wherein the global party profile comprises information indicative of permissible actions associated with the bank account by each of the first user and the second user;

determine that the time-based restriction is associated with the first access identifier and the first user associated with the global party identifier, wherein the time-based restriction comprises a maximum amount of time that the first user is allowed to remain logged on to the on-line account management system during a session using the first access identifier and comprises a maximum number of times that the first user may log on to the on-line account management system using the first access identifier;

determine that the location-based restriction is associated with the first access identifier and the first user associated with the global party identifier, wherein the location-based restriction prohibits the first user from logging on to the on-line account management system from a location using the first access identifier;

determine that the functionality restriction is associated with the first access identifier and the first user associated with the global party identifier, wherein the functionality restriction prohibits the first user, using the first access identifier, from accessing the on-line account management system to transfer funds that exceed a transaction limit from the bank account to a different account and prohibits the first user from creating an access identifier that would be associated with a different user;

wherein the time-based, location-based, functionality-based, and device-based restrictions are not associated with the second access identifier for the second user associated with the global party identifier; and determine whether the first action associated with the bank account is permissible based on the restriction information associated with the first access identifier and the global party identifier.

2. The on-line account management system of claim 1, wherein the first action comprises logging on to the on-line account management system.

3. The on-line account management system of claim 1, wherein the processor is further operable to:

facilitate receiving a request from the second user associated with the second access identifier to create another access identifier associated with the global party identifier;

determine whether the second user is allowed to create another access identifier according to a functionality restriction; and if the second user is allowed to create another access identifier, the processor is further operable to create another access identifier and associate the another access identifier with an identifier restriction, wherein the identifier restriction comprises at least one of a time-based, a location-based, a device-based, and a functionality-based restriction.

4. The on-line account management system of claim 1, wherein the processor is further operable to create the second access identifier for the second user associated with the global party identifier for use by an on-line account aggregator.

5. A method for facilitating access to an on-line account management system, comprising:

receiving a request to perform a first action associated with a bank account using an on-line account management system, wherein the request comprises a first access identifier;

determining a global party identifier associated with the first access identifier, wherein the global party identifier is associated with a first user that is associated with the first access identifier, and the global party identifier is also associated with a second user that is associated with a second access identifier, wherein the first user and the second user are different users;

accessing restriction information associated with the first access identifier and the global party identifier from a global party profile operable to store each of a time-based, a location-based, and a device-based restriction associated with actions capable of being performed with the bank account using the on-line account management system, wherein the global party profile comprises information indicative of permissible actions associated with the bank account by each of the first user and the second user;

determining, using a processor, that the time-based restriction is associated with the first access identifier and the first user associated with the global party identifier, wherein the time-based restriction comprises a maximum amount of time that the first user is allowed to remain logged on to the on-line account management system during a session using the first access identifier and comprises a maximum number of times that the first user may log on to the on-line account management system using the first access identifier;

determining, using the processor, that the location-based restriction is associated with the first access identifier and the first user associated with the global party identifier, wherein the location-based restriction prohibits the first user from logging on to the on-line account management system from a location using the first access identifier;

determining, using the processor, that the functionality restriction is associated with the first access identifier and the first user associated with the global party identifier, wherein the functionality restriction prohibits the first user, using the first access identifier, from accessing the on-line account management system to conduct transactions transfer funds that exceed a transaction limit from the bank account to a different account and prohibits the first user from creating an access identifier that would be associated with a different user;

wherein the time-based, location-based, functionality-based, and device-based restrictions are not associated with the second access identifier for the second user associated with the global party identifier; and determining whether the first action associated with the bank account is permissible based on the restriction information associated with the first access identifier and the global party identifier.

6. The method of claim 5, wherein the first action comprises logging on to the on-line account management system.

7. The method of claim 5, further comprising:

receiving a request from the first user associated with the first access identifier to create the second access identifier associated with the global party identifier;

determining whether the first user is allowed to create the second access identifier according to a functionality restriction;

if the first user is allowed to create the second access identifier, creating the second access identifier and associating the second access identifier with an identifier restriction, wherein the identifier restriction comprises at least one of a time-based, a location-based, a device-based, and a functionality-based restriction.

8. The method of claim 5, further comprising creating the second access identifier associated with the global party identifier for use by an on-line account aggregator.

9. A non-transitory computer readable medium comprising logic, the logic when executed by a processor, operable to:
receive a request to perform a first action associated with a bank account using an on-line account management system, wherein the request comprises a first access identifier;
determine a global party identifier associated with the first access identifier, wherein the global party identifier is associated with a first user that is associated with the first access identifier, and the global party identifier is also associated with a second user that is associated with a second access identifier, wherein the first user and the second user are different users;
access restriction information associated with the first access identifier and the global party identifier from a global party profile operable to store each of a time-based, a location-based, and a device-based restriction associated with actions capable of being performed with the bank account using the on-line account management system, wherein the global party profile comprises information indicative of permissible actions associated with the bank account by each of the first user and the second user;
determine that the time-based restriction is associated with the first access identifier and the first user associated with the global party identifier, wherein the time-based restriction comprises a maximum amount of time that the first user is allowed to remain logged on to the on-line account management system during a session using the first access identifier and comprises a maximum number of times that the first user may log on to the on-line account management system using the first access identifier;
determine that the location-based restriction is associated with the first access identifier and the first user associated with the global party identifier, wherein the location-based restriction prohibits the first user from logging on to the on-line account management system from a location using the first access identifier;
determine that the functionality restriction is associated with the first access identifier and the first user associated with the global party identifier, wherein the functionality restriction prohibits the first user, using the first access identifier, from accessing the on-line account management system to conduct transactions transfer funds that exceed a transaction limit from the bank account to a different account and prohibits the first user from creating an access identifier that would be associated with a different user;
wherein the time-based, location-based, functionality-based, and device-based restrictions are not associated with the second access identifier for the second user associated with the global party identifier; and
determine whether the first action associated with the bank account is permissible based on the restriction information associated with the first access identifier and the global party identifier.

10. The computer readable medium of claim 9, wherein the first action comprises logging on to the on-line account management system.

11. The computer readable medium of claim 9, the logic further operable to:
receive a request from the first user associated with the first access identifier to create the second access identifier associated with the global party identifier;
determine whether the first user is allowed to create the second access identifier according to a functionality restriction;
if the first user is allowed to create the second access identifier, create the second access identifier and associating the second access identifier with an identifier restriction, wherein the identifier restriction comprises at least one of a time-based, a location-based, a device-based, and a functionality-based restriction.

12. The computer readable medium of claim 9, the logic further operable to create the second access identifier associated with the global party identifier for use by an on-line account aggregator.

* * * * *